(12) United States Patent
Adkins

(10) Patent No.: US 7,423,112 B2
(45) Date of Patent: Sep. 9, 2008

(54) POLYETHER POLYOLS CONTAINING PENDANT AMINE GROUPS AND A PROCESS FOR THEIR PREPARATION

(75) Inventor: Rick L. Adkins, Hurricane, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 451 days.

(21) Appl. No.: 10/855,712

(22) Filed: May 27, 2004

(65) Prior Publication Data

US 2005/0267287 A1 Dec. 1, 2005

(51) Int. Cl.
 *C08G 65/34* (2006.01)
(52) U.S. Cl. ..................... 528/425; 521/167
(58) Field of Classification Search ................. 528/425; 521/167
 See application file for complete search history.

(56) References Cited

U.S. PATENT DOCUMENTS

| | | | |
|---|---|---|---|
| 3,000,963 A | 9/1961 | Speranza | 260/615 |
| 3,299,151 A | 1/1967 | Wismer | 260/615 |
| 3,654,370 A * | 4/1972 | Yeakey | 564/480 |
| 3,666,726 A | 5/1972 | Grogler et al. | 260/77.5 CH |
| 3,691,112 A | 9/1972 | Grogler et al. | 260/2.5 AM |
| 4,110,268 A | 8/1978 | Longley et al. | 521/177 |
| 4,156,775 A * | 5/1979 | Evani et al. | 528/421 |
| 4,198,269 A * | 4/1980 | Evani et al. | 162/164.3 |
| 4,281,199 A * | 7/1981 | Langdon | 564/475 |
| 4,380,502 A | 4/1983 | Müller et al. | 252/182 |
| 4,430,490 A | 2/1984 | Doerge | 528/77 |
| 4,877,879 A | 10/1989 | Gansow | 544/402 |
| 4,902,768 A | 2/1990 | Gerkin et al. | 528/68 |
| 5,015,774 A | 5/1991 | Suekane et al. | 564/475 |
| 5,043,472 A | 8/1991 | Mafoti | 560/358 |
| 5,100,997 A * | 3/1992 | Reisch et al. | 528/60 |
| 5,693,864 A * | 12/1997 | Slack et al. | 564/474 |
| 5,786,405 A | 7/1998 | Schilling et al. | 521/167 |
| 5,874,623 A * | 2/1999 | Adkins et al. | 564/474 |
| 2004/0039133 A1* | 2/2004 | Scherzer et al. | 525/403 |

FOREIGN PATENT DOCUMENTS

| | | |
|---|---|---|
| JP | 57168917 | 10/1982 |
| JP | 57168918 | 10/1982 |
| WO | 02/44240 A1 | 6/2002 |
| WO | 03/080241 A1 | 10/2003 |
| WO | WO 03/080241 * | 10/2003 |

OTHER PUBLICATIONS

Huang et al. {Controlled ring-opening polymerization of propylene oxide catalyzed by double metal-cyanide complex, Journal of Polymer Science, Part A: Polymer Chemistry (2002), 40(8), 1142-1150}.*
Huang et al. Controlled ring-opening polymerization of propylene oxide catalyzed by double metal-cyanide complex, Journal of Polymer Science, Part A: Polymer Chemistry (2002), 40(8), 1142-1150.*

* cited by examiner

*Primary Examiner*—Yvonne Eyler
*Assistant Examiner*—Chukwuma O Nwaonicha
(74) *Attorney, Agent, or Firm*—Lyndanne M. Whalen; N. Denise Brown

(57) ABSTRACT

The present invention relates to novel polyether polyols containing pendant amine group and to a process for their preparation. These polyether polyols have molecular weights of from about 105 to about 35,000, and contain at least one terminal hydroxyl group and at least one pendant amine group. The process for their preparation comprises reacting a compound containing from 1 to 10 hydroxyl groups and a molecular weight of about 32 to about 15,000 with at least one epoxide which contains one or more halogen atoms, in the presence of one or more DMC catalysts, to form an intermediate polyether polyol which contains halogenated carbon atoms; then reacting this intermediate polyether polyol with an amine group containing compound having from 1 to 3 primary, secondary and/or tertiary amine groups.

7 Claims, No Drawings

POLYETHER POLYOLS CONTAINING PENDANT AMINE GROUPS AND A PROCESS FOR THEIR PREPARATION

BACKGROUND OF THE INVENTION

The present invention relates to novel amine group containing polyether polyols and to a process for their preparation. These novel amine group containing polyether polyols contain at least one terminal hydroxyl group, at least one pendant amine group, and have molecular weights of from about 105 to about 35,000. The novel process comprises reacting a compound containing one or more hydroxyl group with an epoxide which contains at least one halogen atom, in the presence of one or more double-metal cyanide catalysts to form an intermediate polyether polyol containing halogenated carbon atoms, and reacting this intermediate polyether polyol with a primary, secondary or tertiary amine group containing compound.

Polyether polyols are known in the art for the preparation of a variety of polyurethanes. The polyether polyols are typically prepared by reacting a polyhydric alcohol such as sucrose, diethylene glycol, trimethylolpropane, etc., with an alkylene-oxide such as, for example, ethylene oxide or propylene oxide, in the presence of an alkaline catalyst such as sodium hydroxide. After reaction, the alkaline catalyst is typically removed by one of various methods. Suitable processes for the production of polyether polyols and removal of catalyst residues as are described in, for example, U.S. Pat. Nos. 3,000,963, 3,299,151, 4,110,268, 4,380,502 and 4,430,490.

Other known polyether polyols include the so-called amine-initiated polyether polyols as well as the amine-terminated polyether polyols. Amine-intiated polyether polyols have hydroxyl end groups and one or more amine groups as part of the polyether backbone. Amine-terminated polyether polyols have a conventional polyether backbone and contain at least about 50% by weight of amine groups in terminal positions.

Amine-initiated polyether polyols and processes for their production are known and described in, for example, U.S. Pat. Nos. 4,877,879 and 5,786,405, and Japanese Abstracts 57168917A and 57168918. These polyether polyols show promising results in foam-forming systems blown without CFC blowing agents. Such polyether polyols can be formed by reacting an amine such as, for example, ethylene diamine or toluene diamine, with an alkylene oxide such as, for example, ethylene oxide or propylene oxide. Overall, this process is quite similar to the conventional process of preparing a polyether polyol, except the initiator contains one or more amine group. The reaction may also be catalyzed with an alkaline catalyst such as potassium hydroxide. The addition of conventional antioxidants such as, for example, butylated hydroxyl toluene (BHT) to the resultant amine-initiated polyether polyols is necessary to minimize color formation in the polyether polyols and foams produced therefrom.

There are several known processes for preparing amine-terminated polyether polyols. These include, for example, U.S. Pat. Nos. 3,654,370, 3,666,726, 3,691,112, 5,043,472, 4,902,768, 5,015,774 and 5,693,864. Amine-terminated polyether polyols may be prepared by, for example, reacting a polyol with ammonia under catalyzed high temperature conditions, reacting a polyfunctional acetoacetic acid ester with a polyfunctional amine, by catalytic amination of a suitable polyol by reacting the polyol with a primary or secondary amine in the presence of a catalyst, by reacting a polyoxyalkylene polyol with a primary amine in the presence of a suitable catalyst, or by reacting a polyether containing multiple leaving groups with a primary amine or ammonia.

U.S. Pat. Nos. 4,156,775 and 4,198,269 relate to quaternary ammonium salts of epihalohydrin polymers. These are prepared by first reacting epichlorohydrin (i.e. ECH) with, e.g. diglycidyl ether of BPA (see Example 1 in the '269 patent) in the presence of water and $BF_3$, followed by making a 25% solution of the polymer by dissolving it in acetonitrile, cooling, and adding anhydrous dimethylamine to the solution. The disadvantage of alkoxylation catalyst described therein is that cationic alkoxylation catalysts such as $BF_3$, are strongly acidic, and always yield cyclic oligomers of the alkyene oxides, regardless of the catalyst concentration. The cyclic oligomers are difficult to remove completely and impart a strong odor to the resultant polyether polyol product, even when the cyclic oligomers are present at low parts per million (ppm) levels.

Advantages of the presently claimed polyether polyols include the ability to intersperse functional groups (e.g. chloride, bromide, etc.) throughout the polyether molecule with little or no side products and no degradation of the functional groups during alkoxylation. This allows the formation of polyethers which contain varying amounts of pendant amine groups, as well as flexibility in the functionality of the amine group itself (i.e. primary, secondary, tertiary, or quaternary amine groups).

SUMMARY OF THE INVENTION

This invention relates to polyether polyols having at least one terminal hydroxyl group, at least one pendant amine group, and which have a molecular weight of from about 105 to about 35,000. The present invention also relates to a process for the preparation of these polyether polyols.

The present polyether polyols have a molecular weight of from about 105 to about 35,000, contain at least one terminal hydroxyl group and at least one pendant amine group. These polyether polyols comprise the reaction product of:
(1) a polyether polyol containing halogenated carbon atoms, having a molecular weight of from about 120 to about 25,000 and containing from about 1 to about 10 hydroxyl groups, and which comprises the reaction product of:
    (a) an organic compound containing from 1 to 10 hydroxyl groups (preferably from 2 to 8 hydroxyl groups) and having a molecular weight of from about 32 to about 15,000 (preferably from about 62 to about 5,000), and
    (b) one or more epoxides wherein at least one epoxide contains one or more halogen atoms (preferably from 1 to 6 halogen atoms and most preferably from 1 to 2 halogen atoms),
    in the presence of
    (c) one or more double-metal cyanide catalysts;
with
(2) an amine group containing compound having from 1 to 3 primary, secondary and/or tertiary amine groups, and having a molecular
    weight of from about 17 to about 500.

The reaction between the polyether polyol and the amine group containing compound is typically ran at a temperature of from about 50 to about 250° C.

The process of preparing these amine group containing polyether polyols comprises:
(1) reacting
    (a) an organic compound containing from 1 to 10 hydroxyl groups (preferably from 2 to 8 hydroxyl groups) and having a molecular weight of from about 32 to about 15,000 (preferably from about 62 to about 5,000),
with
(b) one or more epoxides wherein at least one epoxide contains one or more halogen atoms (preferably from 1 to 6 halogen atoms and most preferably from 1 to 2 halogen atoms),
in the presence of
(c) one or more double-metal cyanide catalysts, to form a polyether polyol containing halogenated carbon atoms, having a molecular weight of from about 120 to about 25,000, and
containing from about 1 to 10 hydroxyl groups;
and
(2) reacting
(a) the resultant polyether polyol containing halogenated carbon atoms formed in (1),
with
(b) an amine group containing compound having from 1 to 3 primary, secondary and/or tertiary amine groups, and having a molecular weight of from about 17 to about 500,
thereby forming a polyether polyol containing at least one terminal hydroxyl group, having a molecular weight of from 105 to 35,000, and containing at least one pendant amine group. The reaction between the polyether polyol which contains halogenated carbon atoms and the amine group containing compounds is typically ran at a temperature of from about 50 to about 250° C.

DETAILED DESCRIPTION OF THE INVENTION

Suitable organic compounds which contain hydroxyl groups to be used in the present invention include compounds such as, for example monols, diols (i.e. those compounds which are also commonly called chain extenders) triols (i.e. those compounds which are also commonly called crosslinkers), tetraols and other polyols, polyether polyols, polyester polyols, polycarbonate polyols, hydrocarbon polyols such as polybutadiene polyols, etc.

These organic compounds which contain hydroxyl groups typically contain at least 1 hydroxyl groups, and preferably at least 2 hydroxyl groups. These compounds also typically contain less than or equal to 10 hydroxyl groups, preferably less than or equal to 8 hydroxyl groups. These organic compounds which contain hydroxyl groups may also contain any number of hydroxyl groups ranging between any combination of these upper and lower values, inclusive, e.g. from 1 to 10 hydroxyl groups and preferably from 2 to 8 hydroxyl groups.

The molecular weight of the organic compounds containing hydroxyl groups typically is at least about 32, preferably at least about 62. These compounds also typically have molecular weights of no more than about 15,000 and preferably of no more than about 5,000. The organic compounds containing hydroxyl groups may also have a molecular weight ranging between any combination of these upper and lower values, inclusive, e.g. from about 32 to about 15,000, and preferably from about 62 to about 5,000.

Among the suitable compounds containing hydroxyl groups are those higher molecular weight compounds of the type known for the production of polyurethanes. Some examples include, but are not limited to, polyether polyols, polyester polyols, polycarbonate polyols, etc. More specifically, the typical polyether polyols are usually higher molecular weight compounds are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably, ethylene oxide and propylene oxide, in admixture or successively to components containing reactive hydrogen atoms such as alcohols. Examples of suitable starters include the low molecular weight chain extenders set forth hereinafter, propylene glycol, glycerin, trimethylolpropane, sucrose, ethanolamine, triethanolamine, aniline, aminophenol.

Polyether polyols are preferably used. Preferred polyethers include, for example, those compounds based on di-functional and tri-functional starters such as, for example, propylene glycol, glycerin, trimethylolpropane, etc.

Suitable polyesters, polythioethers, polyacetals, polycarbonates and other polyhydroxyl compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32-42 and 44-54, and Volume II, 1964, pages 5-6 and 198-199; and in Kunststoff-Handbuch, Vol. VII, Vieweg-Hochtlen, Carl Hanser Verlag, Munich, 1966, pages 45-71.

Other suitable compounds include lower molecular weight hydroxyl group containing compounds such as, for example, the low molecular weight alcohols identified hereinabove as suitable starters for the polyether polyols, etc. These compounds include propylene glycol, glycerin, trimethylolpropane, sucrose, but are not limited to of glycerol, 2-methyl-1, 3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, neopentyl glycol, cyclohexane-dimethanol, 2,2,4-trimethylpentane-1, 3-diol, pentaerythritol, trimethylolpropane mixtures thereof, other tri- and/or tetra- and/or penta and/or higher-functional polyols, and other tri- and/or tetra- and/or penta-functional polyethers, and tri- and/or tetra-and/or penta-functional polyesters, such as, for example, polycaprolactone triols. Suitable tri-, tetra- and/or penta-functional polyethers include, for example, compounds prepared by the alkoxylation (preferably, ethoxylation and/or propoxylation) of glycerol, trimethylolpropane, pentaerythritol, monoethanolamine, and other tri- or tetra- or penta-functional starter compounds, provided that the above mentioned molecular weight limits and number of hydroxyl groups are satisfied. It is, of course, also possible to use mixtures of the above identified di-, tri- and tetra-functional compounds or mixtures of other starter compounds may be used as a starter for preparing polyethers to provided that the molecular weight and functionality requirements described above are satisfied. Preferred compounds include trifunctional polyethers prepared by alkoxylation of glycerol, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, neopentyl glycol, cyclohexane-dimethanol, 2,2,4-trimethylpentane-1,3-diol, etc. Preferred diols include, for example, 1,4-butanediol, dipropylene glycol, and diethylene glycol.

Other suitable polyols for the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4-1,6- and 1,8-dihydroxyoctane, 1,10-dihydroxydecane, glycerol, 1,2, 4-trihydroxybutane, 1,2,6-trihydroxyhexane, 1,1,1-trimethyl-olethane, 1,1,1-trimethylolpropane, pentaerythritol, caprolactane, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference. Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis(hydroxyphenol)ethanes, etc.

Suitable epoxides which contain one or more halogen atoms, preferably from 1 to 6and most preferably from 1 to 2 halogen atoms include, for example, but are not limited to epifluorohydrin, epichloro-hydrin, epibromohydrin, epi-iodohydrin, 1,1,1,2,3,3-hexachloro-2,3-epoxypropane, 2-chloro-3-(chloromethyl)oxirane, 3-dichloro-2-(chloro-methyl)oxirane, 1,2-epoxy-2,3-dichloropropane, 1,1,1-trichloro-2,3-epoxypropane, 1,4-dichloro-2,3-epoxybutane, 1,1,1-trichloro-3,4-epoxybutane, tetrafluoethylene oxide, etc. Epichlorohydrin is a preferred epoxide containing halogen atoms.

The quantity of epoxides containing one or more halogen atoms is preferably from about 1 to about 90% by weight, more preferably from about 5 to about 80% by weight, and most preferably from about 10 to about 70% by weight, based on 100% by weight of the combined weight of (1)(a), the organic compound containing 1 to 10 hydroxyl groups and having a molecular weight of 32 to 15,000, and (1)(b), the epoxide containing one or more halogen atoms. The sum of the %'s by weight of (1)(a) and (1)(b) total 100% by weight.

Suitable double-metal cyanide catalysts include, for example, those double-metal cyanide catalysts as known and described in, for example, U.S. Pat. Nos. 5,158,922 and 6,018,017, the disclosures of which are herein incorporated by reference. Generally, the quantity of DMC catalyst preferably ranges from about 10 ppm to about 2.0% by weight, based on 100% by weight of the combined weight of (1)(a), the organic compound containing 1 to 10 hydroxyl groups and having a molecular weight of 32 to 15,000, and (1)(b), the epoxide containing one or more halogen atoms. It is more preferred to use from about 20 ppm to about 0.8% by weight of one or more DMC catalysts, based on 100% by weight of the combined weight of (1)(a) and (1)(b).

In accordance with the present invention, the organic compound which contains hydroxyl groups is reacted with one or more epoxides wherein at least one epoxide contains one or more halogen atoms in the presence of one or more double-metal cyanide catalysts. This results in a polyether polyol containing one or more halogenated carbon atoms and has a molecular weight of from about 120 to about 25,000, and contains from 1 to about 10 hydroxyl groups.

In the process for preparing the polyether polyol containing halogenated carbon atoms, the organic compound is typically reacted with the alkylene oxide at temperatures of about 60 to about 180° C. for time periods of from about 1 to about 10 hours, in the presence of the alkoxylation catalyst. It is preferred that this reaction is at temperatures of about 90 to about 140° C. for a time of from about 2 to about 7 hours.

Suitable amine group containing compounds to be reacted with the polyether polyol which contains halogenated carbon atoms includes, for example, amines such as primary amines, secondary amines, tertiary amines and mixtures thereof. These amine group containing compounds typically have a molecular weight of at least about 17, and preferably of at least about 31. These amine group containing compounds also typically have a molecular weight of about 500 or less, and preferably of about 300 or less. The amine group containing compounds may have a molecular weight ranging between any combination of these upper and lower molecular weight values, inclusive, e.g. from 17 to 500 and preferably from 31 to 300.

In addition, the amine group containing compounds typically have at least one amine group, and preferably 1 or more amine groups. These amine group containing compounds also typically have 3 or less amine groups, and preferably 2 or less amine groups. The amine group containing compounds may have any number of amine groups ranging between any combination of these upper and lower values, inclusive, e.g. from 1 to 3 amine groups and preferably from 1 to 2 amine groups. Suitable amine groups of these compounds are selected from the group consisting of primary amine groups, secondary amine group, tertiary amine groups and mixtures thereof.

Some examples of suitable amine group containing compounds include, but are not limited to, ammonia, butylamine, aniline, methoxyaniline, cyclohexylamine, 2-ethylhexylamine, dimethylamine, diethylamine, N-methylaniline, N-ethylaniline, trimethylamine, triethylamine, tributylamine, 1,2-diaminoethane, 1,3-diaminopropane, 3-(N,N-dimethylamino)propylamine, and mixtures thereof. Preferred are amines with 3 or more carbons. Most preferred are amines with 6 or more carbons.

It is also possible to use hydroxyl containing amines as the amine group containing compound in accordance with the present invention provided the above limits on molecular weight, functionality and types of amine groups are observed. These hydroxyl containing amines are preferably free of ether functionality or ether bridging groups. Some examples of suitable compounds to be used as hydroxyl containing amines include compounds such as, for example, ethanolamine, iso-propanolamine, aminophenol, diethanolamine, N-methy-laminoethanol, N-methylaminophenol, triethanolamine, tris (hydroxymethyl)aminomethane. Preferred are amines with 3 or more carbons. Most preferred are amines with 4 or more carbons.

Generally, the quantity of amine group containing compound is preferably present in an amount such that there are from about 0.5 to about 5 moles of amine per equivalent of halogen group in the polyether polyol containing halogenated carbon atoms (i.e. the halogenated polyether polyol). More preferably, the quantity of amine group containing compound is present such that there are from about 1.0 to about 4.0 moles of amine per equivalent of halogen group in the halogenated polyether polyol. It is most preferred that there are from about 1.5 to about 3.0 moles of amine per equivalent of halogen group in the halogenated polyether polyol.

In accordance with the presently claimed process, the polyether polyol containing halogenated carbon atoms is reacted with the amine group containing compound, preferably in the presence of one or more basic catalysts. This portion of the reaction occurs at temperatures ranging from about 50 to about 250° C., preferably from about 70 to about 160° C., for a time period ranging from about 1 to about 8 hours, and preferably from about 2 to about 6 hours. This process results in a polyether polyol compound which contains at least one pendant amine group, preferably from about 2 to about 6 pendant amine groups, and having a molecular weight of from about 105 to about 35,000, preferably from about 500 to about 15,000. The amine groups in these polyether polyol compounds are pendant amine groups. The polyether polyols containing pendant amine groups of the present invention preferably contains from 1 to 10 terminal hydroxyl groups, and most preferably from 2 to 8 terminal hydroxyl groups.

It may be advantageous to neutralize the finally produced polyether polyol which contains at least one pendant amine group. This is particularly true when the amine group containing compound having from 1 to 3 amine groups contains primary amine groups, secondary amine groups or mixtures thereof.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The Following Components were used in the Working Examples:

Polyol A: a 425 molecular weight PO diol with a hydroxyl number of 264.
Polyol B: a 700 molecular weight PO triol with a hydroxyl number of 238.
Catalyst A: a potassium hexacyanocobaltate catalyst sold as Arcol Catalyst 3

Example 1

Polyol A (100 g) was added to a 500 mL flask equipped with a dry ice condenser. Catalyst (0.064 g) was added and the polyol was vacuum stripped at 130° C. for 1 hour under a nitrogen sparge. The flask was padded with nitrogen and the condenser packed with a dry ice/acetone mixture. Epichlorohydrin (15 g) was added and stirred for 15 minutes at 130° C. to activate the catalyst. Additional epichlorohydrin (29 g) was added dropwise over 20 minutes. The reaction was then stirred at 130° C. for 6 hours. Analysis by GC and GPC indicated that the product was 24% by weight epichlorohydrin.

Example 2

Polyol B (150 g) and Catalyst (1.24 g) were added to a 1L stainless steel pressure vessel. The mixture was nitrogen sparged at 130° C. for 1 hour while pulling a 10 mmHg vacuum. Propylene oxide (23 g) was added to initiate the catalyst, then a mixture of PO/epichlorohydrin (592 g/60 g) was co-fed at 3 grams/minute and 0.5 grams/minute, respectively. The product was heated for 1 hour at 130° C. after oxide addition, then vacuum stripped 30 minutes at 10 mm Hg to give a clear liquid with a hydroxyl number of 54.2. Analysis of the product showed epichlorohydrin to be 5.9% by weight of the molecule.

Example 3

The polyol formed in Example 2 (600 g) was added to a 1 liter flask, along with 99 g of dibutylamine. The mixture was heated at 150° C. for 3 hours, cooled to 70° C. and then neutralized with 30.6 grams of 50% NaOH solution. Water and excess dibutylamine were vacuum stripped at 150° C. and the product filtered to give a liquid product with a 50.8 hydroxyl number.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing polyether polyols containing pendant amine groups comprising:
   (A) reacting
      (a) an organic compound containing from 1 to 10 hydroxyl groups and having a molecular weight of from about 32 to about 15,000, with
      (b) one or more epoxides wherein at least one epoxide contains one or more halogen atoms, in the presence of
      (c) one or more double-metal cyanide catalysts, to form a polyether polyol containing halogenated carbon atoms having a molecular weight of from about 120 to about 25,000 and containing from about 1 to about 10 hydroxyl groups; and
   (B) reacting
      (a) the resultant polyether polyol containing halogenated carbon atoms formed in (A), with
      (b) an amine group containing compound having from 1 to 3 amine groups and a molecular weight of from about 17 to about 500, wherein said amine groups are selected from the group consisting of primary amine groups, secondary amine groups, tertiary amine groups and mixtures thereof,
   thereby forming a polyether polyol having a molecular weight of from 105 to 35,000, and containing at least one terminal hydroxyl group and at least one pendant amine group.

2. The process of claim 1, wherein (A)(a) said organic compound contains from 2 to 8 hydroxyl groups and has a molecular weight of from about 62 to about 5,000.

3. The process of claim 1, wherein (A)(b) said epoxide contains from 1 to 6 halogen atoms.

4. The process of claim 3, wherein (A)(b) said epoxide contains from 1 to 2 halogen atoms.

5. The process of claim 1, wherein (A)(b) said epoxide comprises epichlorohydrin.

6. The process of claim 1, wherein (B)(b) said amine group containing compound has a functionality of from 1 to 2 and a molecular weight of from 31 to 300.

7. The process of claim 1, wherein the resultant polyether polyol has a molecular weight of from about 500 to about 15,000, and contains from about 2 to about 6 pendant amine groups.

* * * * *